Aug. 16, 1938.  D. G. TAYLOR  2,127,472
TEMPERATURE CHANGING SYSTEM
Filed Sept. 5, 1935
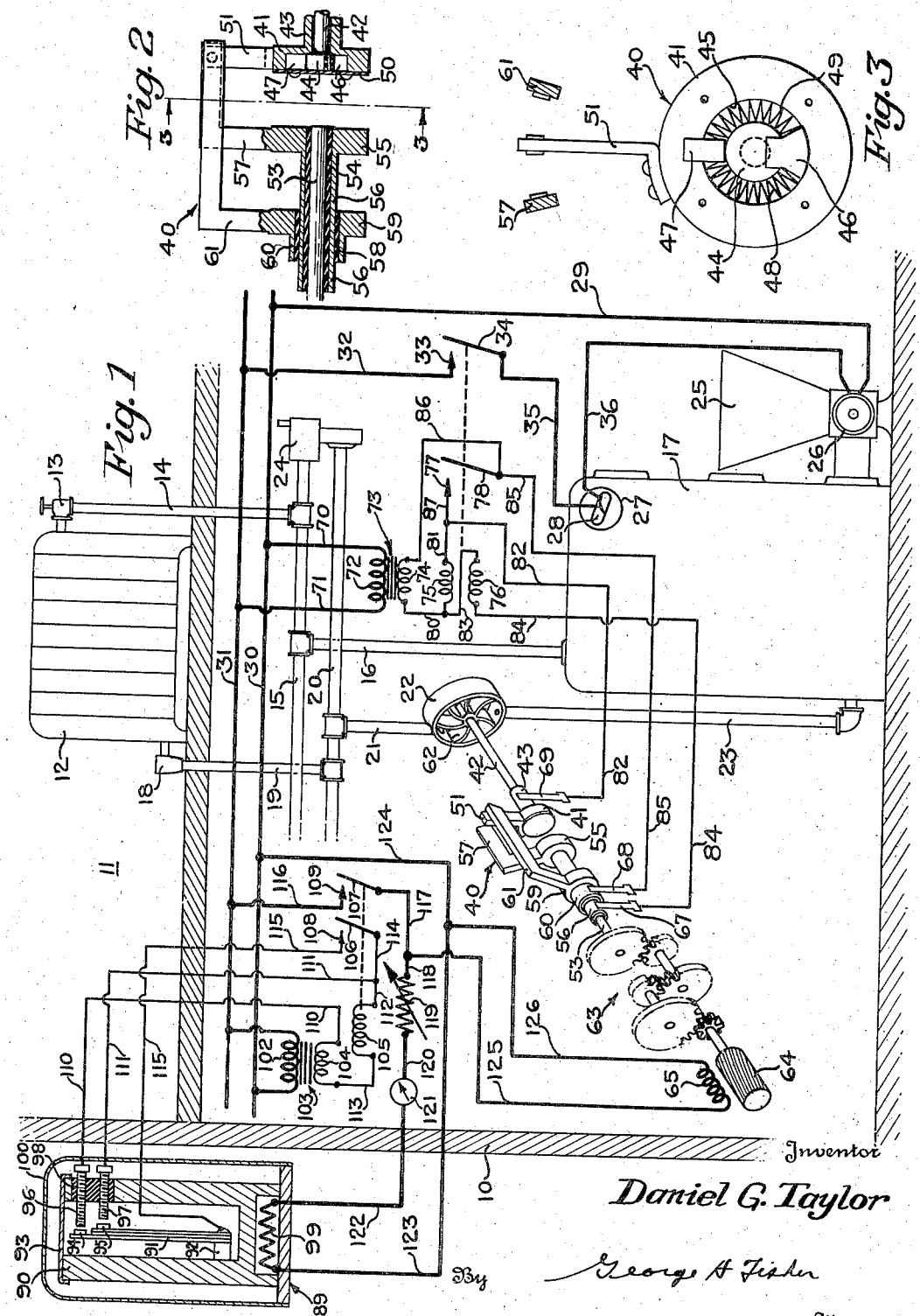
Inventor
Daniel G. Taylor
By George A. Fisher
Attorney Patented Aug. 16, 1938

2,127,472

UNITED STATES PATENT OFFICE 2,127,472

TEMPERATURE CHANGING SYSTEM

Daniel G. Taylor, Minneapolis, Minn., assignor to Minneapolis-Honeywell Regulator Company, Minneapolis, Minn., a corporation of Delaware Application September 5, 1935, Serial No. 39,298

10 Claims. (Cl. 236—1)

This invention relates to temperature changing systems of the type disclosed in my copending application Serial No. 512,887, filed February 2, 1931.

The system disclosed in the above referred to application comprises an outdoor controller responsive to outdoor atmospheric conditions, including temperature, wind, and solar radiation for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outside controller. Due to the proportional relationship of the heating means with the heat losses of the building and the outside controller, a definite temperature relation is maintained within the building and the outside controller so that by responding to the temperature of the outside controller, the thermostatic device maintains a constant or normal temperature within the building.

From the above it follows that the temperature changing system disclosed in my copending application measures the heat demand and controls the amount of heat supplied to the building purely as a time function and in order for the amount of heat supplied to the building to be proportional to the demand for heat, or to the amount of heat supplied to the outdoor controller, it is necessary for the outdoor controller to control some source of heat in which the amount of heat supplied is in direct proportion to the operating time. In other words, upon a call for heat by the outdoor controller for a given interval of time, a given amount of heat must be supplied to the building. This is substantially true of steam valves controlling the supply of steam to a building from a source maintained at approximately constant pressure and it is also substantially true where the outdoor controller controls an oil or gas burner. However, in the case of such heat sources as stokers, etc. demand by the outdoor controller for operation for a definite length of time does not give any accurate measure of the amount of heat delivered in that time since under favorable conditions of draft, fuel bed, etc., several times as much heat may be supplied in a given time as will be supplied when these conditions are less favorable.

It is therefore an object of this invention to remedy the above defects in the described system wherein the heat source is controlled by a stoker, etc.

More specifically, it is an object of this invention to provide a means for determining or measuring the amount of heat required to be delivered to the building, means for determining or measuring the actual amount of heat delivered to the building and means for correlating these two means into a control device for controlling the operation of a stoker or the like whereby truly proportional amounts of heat may be accurately determined and delivered to the outdoor controller and the building.

The novel manners in carrying out this type of control for a temperature changing system also provide objects of this invention.

Other objects and advantages of this invention will become apparent to those skilled in the art upon reference to the accompanying specification, claims and drawing in which:

Fig. 1 is a diagrammatic illustration of the preferred form of my invention.

Fig. 2 is a partial sectional view of the switching mechanism used in Fig. 1.

Fig. 3 is an enlarged sectional view taken substantially on the line 3—3 of Fig. 2 but with the retaining plate omitted for purposes of clearness.

Referring to Fig. 1, the temperature changing system of this invention is shown as applied to a building having an outside wall 10 and a plurality of spaces to be conditioned one of which is shown at 11. Although this invention in its broad aspect contemplates a cooling system, as well as a heating system, for purposes of illustration I have shown a particular type of heating system which may take the form of a steam heating system. Located in the spaces to be heated 11 are radiators or heat exchangers 12 to which steam is supplied by means of risers 14. The usual radiator valves 13 are connected between the risers 14 and the radiators 12. The risers 14 are connected into a steam header 15 which in turn is connected to a boiler 17 by a steam supply pipe 16. Therefore, when steam is generated in the boiler 17, it passes through the supply pipe 16, the header 15 and the risers 14 into the radiators 12 to be condensed therein. Water or condensation is returned to the boiler 17 from the radiators 12 through the conventional steam traps 18, the return risers 19, return header 20 and return pipes 21 and 23. Connected between the return pipes 21 and 23 is a condensate meter 22 of usual design for performing a control function in the manner to be pointed out hereafter. By employing the steam traps 18, condensate only is allowed to return to the boiler as is usual in heating systems of this type. A steam trap 24 is located between the supply header 15 and the return header 20 to drain off any condensate that may form in the high side of the steam heating system. The above described steam heating system is well-known in the art and any other appliances that are used in such heating systems may be applied in the system briefly described.

The boiler 17 is shown as being fired by a stoker 25 although any other type of firing means may be used. The stoker 25 is of usual design and is operated in the usual manner by an electric motor 26. A high limit pressure switch 27 of usual design is provided in the boiler to prevent the forming of undue pressure therein. This high limit pressure switch 27 contains a mercury switch 28. The stoker motor 26 is connected by a wire 29 to a line wire 30. The other line wire 31 is connected by a wire 32 to a contact 33. Cooperating with the contact 33 is a switch arm 34 which is connected by a wire 35 to one electrode of the mercury switch 28 operated by the high limit pressure device 27. The other electrode of the mercury switch 28 is connected by a wire 36 to the stoker motor 26.

When the switch arm 34 is moved into engagement with the contact 33 in the manner to be pointed out hereafter, a circuit is completed from the line wire 31 through wire 32, contact 33, switch arm 34, wire 35, mercury switch 28, wire 36, stoker motor 26 and the wire 29 back to the other line wire 30. Completion of this circuit causes operation of the stoker 25 and consequent firing of the boiler 17 whereby steam is generated and delivered to the heat exchangers or radiators 12. As pointed out above, the time required to deliver steam to the heat exchangers or radiators 12 upon closure of switch arm 34 with the contact 33 varies from time to time depending upon the condition of the draft, fuel bed, etc. Upon movement of switch arm 34 out of engagement with the contact 33 or upon the existence of an abnormally high pressure in the boiler 17 so as to tilt the mercury switch 28 into a circuit breaking position, the stoker 25 is placed out of operation to prevent the further generation of steam.

A contacting or switching mechanism is generally shown at 40 and by referring to Figs. 2 and 3, the details of construction are shown therein. This switching mechanism 40 comprises a collar 41, loosely mounted on a normally stationary shaft 42, the collar 41 being provided with an integral electrical conducting sleeve 43. The shaft 42 is provided in any suitable manner with an enlargement 44 which is positioned within an enlarged bore 45 in the collar 41. The enlarged portion 44 of shaft 42 is provided with an abutment key 46 and diametrically positioned from the abutment key 46 is another abutment key 47 carried by the collar 41. Located between the abutment keys 46 and 47 are diametrically opposed springs 48 and 49. These springs 48 and 49 are equally tensioned so as to tend to maintain the abutment keys 46 and 47 diametrically spaced. The keys 46 and 47 and the springs 48 and 49 form a two-way strain release connection between the shaft 42 and the collar 41 so that the shaft 42 and the collar 41 may be rotated with respect to each other but the strain release connections between the shaft 42 and the collar 41 tends to maintain these elements in the position shown in Fig. 3. The springs and keys are held in place in the enlarged bore 45 of the collar 41 by means of a plate 50 suitably secured to the collar 41. Secured to the collar 41 and in electrical contact therewith is a contact arm 51.

A shaft 53 is provided with an insulating sleeve 54 on which is mounted a collar 55, having an integrally formed conducting sleeve 56. The collar 55 is insulated from the shaft 53 by an insulating sleeve 54 and is non-rotatably mounted on the shaft 53 in any suitable manner such as by means of a pressed fit. The collar 55 is provided with a contact arm 57 which extends outwardly adjacent to the contact arm 51. Spaced from the collar 55 and mounted on the sleeve 56 is a collar 59, having an integral conducting sleeve 60. The collar 59 is non-rotatably secured on the sleeve 56 in any suitable manner such as by a pressed fit. The collar 59 is provided with a contact arm 61 which extends outwardly adjacent the other side of the contact arm 51 of the collar 41.

Assume the parts in the position shown in Fig. 1 with the contact 51 spaced midway between the contacts 57 and 61. Movement of the shaft 53 in a counter-clockwise direction as viewed in Fig. 1 causes movement of the contact arm 61 into engagement with contact 51. Continued counter-clockwise movement of shaft 53 causes counter-clockwise movement of both contact arms 61 and 51, this continued movement being permitted by the strain release connection between the contact 51 and the normally stationary shaft 42. Upon stopping of the rotation of the shaft 53 and upon counter-clockwise rotation of shaft 42 the strain release connection is relieved and when the springs 48 and 49 become equally tensioned by this counter-clockwise movement of shaft 42 the contact arm 51 moves out of engagement with the contact arm 61. Continued counter-clockwise movement of the shaft 42 causes movement of the contact arm 51 into engagement with the now stationary contact arm 57. Continued movement of the shaft 42 is permitted by reason of the strain release connection between the contact arm 51 and the shaft 42. Although it has been assumed in this description of the operation of the switching mechanism that one or the other of the shafts 42 and 53 is stationary, it will be seen that relative movement of these shafts will cause substantially the same operation.

The condensate meter 22 is diagrammatically shown to comprise a bucket wheel 62 so that when condensate flows from the return header 20 to the boiler 17, the bucket wheel 62 is rotated in a counter-clockwise direction as viewed in Fig. 1 to rotate the shaft 42 in a counter-clockwise direction. When no condensate is flowing, the wheel 62 and shaft 42 remain stationary. The shaft 53 is driven in a counter-clockwise direction through a reduction gear train 63 by a rotor 64 upon energization of a field 65. The conducting sleeves 56, 60 and 43 are contacted by brushes or fingers 67, 68 and 69, respectively, so that when the contact arm 61 is moved into engagement with the contact arm 51, an electric circuit is completed from the brush 68 to the brush 69 and when the contact arm 51 is moved into engagement with the contact arm 57, an electric circuit is completed from the brush 67 to the brush 69.

A primary 72 of a step-down transformer 73, having a secondary 74 is connected across the line wires 30 and 31 by wires 70 and 71, respectively. A relay comprising an energizing coil 75 and a bucking coil 76 operate a switch arm 78 and the switch arm 34. Upon energization of the energizing coil 75, the switch arms 78 and 34 are moved into engagement with a contact 77 and the contact 33, respectively. Upon energization of the bucking coil 76, which neutralizes the action of the energizing coil 75, the switch arms 78 and 34 are moved out of engagement with their contacts 77 and 33 by means of springs or gravity or other means, not shown. Likewise, when neither energizing coil 75 or bucking coil 76 is energized, the switch arms 78 and 34 are maintained out of engagement with their contacts 77 and 33, respectively, by means of springs, gravity or other means, not shown.

One end of the secondary 74 is connected by a wire 80 to one end of the energizing coil 75. The other end of the energizing coil 75 is connected by wires 81 and 82 to the brush 69. One end of bucking coil 76 is connected by a wire 83 to the junction of wire 80 with the energizing coil 75. The other end of bucking coil 76 is connected by a wire 84 to the brush 67. The brush 68 is connected by a wire 85 to the switch arm 78 and the switch arm 78 is in turn connected by a wire 86 to the other end of secondary 74. A wire 87 connects the contact 77 with the junction of wires 81 and 82.

When the contact arm 61 is moved into engagement with the contact arm 51, a circuit is completed from the secondary 74 through wire 80, energizing coil 75, wires 81 and 82, brush 69, conducting sleeve 43, collar 41, contact arm 51, contact arm 61, collar 59, conducting sleeve 60, brush 68, and wires 85 and 86 back to the secondary 74. Completion of this circuit energizes the energizing coil to move the switch arms 78 and 34 into engagement with the contacts 77 and 33. Movement of the switch arm 34 into engagement with the contact 33 places the stoker 25 in operation with the consequent generation of steam in the boiler 16 and delivery of steam to the heat exchangers or radiators 12. Movement of the switch arm 78 into engagement with the contact 77 completes a maintaining circuit from the secondary 74 through wire 80, energizing coil 75, wires 81 and 87, contact 77, switch arms 78 and wire 86 back to the secondary 74. Completion of this maintaining circuit maintains the relay coil 75 energized even though the contact arm 51 moves out of engagement with the contact arm 61 thus maintaining the boiler fired.

Water or condensation formed in the radiators 12 returns through the return risers 19, the return header 20 and the return pipe 21 into the condensate meter 22. This causes rotation of normally stationary bucket wheel 62 and consequent counter-clockwise rotation of the normally stationary shaft 42. When sufficient rotation of shaft 42 has taken place to move the contact arm 51 into engagement with the contact arm 57, a circuit is completed from the secondary 74 through wires 86 and 85, bucking coil 76, wire 84, brush 67, conducting sleeve 56, collar 55, contact arm 57, contact arm 51, collar 41, conducting sleeve 43, brush 69, wires 82 and 87, contact 77, contact arm 78 and wire 86 back to the secondary 74. Completion of this circuit causes energization of bucking coil 76 which neutralizes the holding action of the energizing coil 75 whereby the switch arms 78 and 34 are moved out of engagement with their contacts 77 and 33. Movement of switch arm 34 out of engagement with the contact 33 prevents the further operation of stoker 25 and the further generation of steam in the boiler 17. Movement of switch arm 78 out of engagement with the contact 77 maintains both the energizing coil 75 and the relay coil 76 deenergized until the contact arm 61 is again moved into engagement with the contact arm 51 to energize the energizing coil 75 in the manner pointed out immediately above.

Located outside of the building in any suitable manner is an outdoor controller, generally designated at 89. The outdoor controller 89 comprises a block 90 which is hollowed out to receive a bimetallic element 91 suitably mounted on a post 92. The bimetallic element 91 responds to the temperature of block 90 and in order to insure that it will not be directly affected by outside temperatures, the block 90 is closed by means of a cover 93. The bimetallic element 91 carries contacts 94 and 95 which are adapted to sequentially engage contacts 96 and 97 which are adjustably mounted in an insulating block 98 carried by the metallic block 90. The distance between the contacts 94 and 96 is less than the distance between the contacts 95 and 97 so that upon a decrease in temperature of block 90, the contact 94 first engages the contact 96 and upon a further decrease in temperature, the contact 95 engages the contact 97. The block 90 is heated by a heater 99 and is cooled by the outdoor atmospheric conditions. The above mechanism comprising the outdoor controller 89 is enclosed within a weathertight casing 100 to protect the same from deterioration by the elements.

A primary 102 of a step-down transformer 103, having a secondary 104 is connected across the line wires 30 and 31. A relay coil designated at 105 operates switch arms 106 and 107 so that upon energization of the relay coil 105, the switch arms 106 and 107 are moved into engagement with contacts 108 and 109. Upon deenergization of relay coil 105, the switch arms 106 and 107 are moved out of engagement with the contacts 108 and 109 by means of springs, gravity, or other means, not shown. One end of secondary 104 is connected by a wire 110 to the adjustable contact 96. The other adjustable contact 97 is connected by wires 111 and 112 to one end of the relay coil 105. The other end of the relay coil 105 is connected by a wire 113 to the other end of secondary 104. The switch arm 106 is connected by a wire 114 to the junction of wires 111 and 112. The contact 108 cooperating with the switch arm 106 is connected by a wire 115 to the bimetallic element 91 located in the outdoor controller 89.

The contact 109 is connected by a wire 116 to the line wire 31. The switch arm 107 cooperating with the contact 109 is connected by wires 117 and 118 to a variable resistance or rheostat 119. The variable resistance or rheostat 119 is in turn connected by a wire 120 to an ammeter 121. The ammeter 121 is connected by a wire 122 to one end of heater 99 of outdoor controller 89. The other end of the heater 99 is connected by wires 123 and 124 to the other line wire 30. One end of the field 65 associated with the rotor 64 is connected by a wire 125 to the junction of wires 117 and 118. The other end of field 65 is connected by a wire 126 to the junction of wires 123 and 124. By reason of these electrical connections, the field 65 and the heater 99 are connected in parallel so that when heater 99 is energized, the field 65 is likewise energized. The variable resistance 119 and the ammeter 121 afforded means for adjusting and visually indicating the amount of heat delivered to the block 90 and the heater 99.

When the temperature of block 90 falls to a predetermined value, the contact 94 is moved into engagement with the contact 96 and when the temperature of the block falls below this predetermined value, the contact 95 is moved into engagement with the contact 97 to complete a circuit from the secondary 104 through wire 110, contacts 96, 94, 95 and 97, wires 111 and 112, relay coil 105 and wire 113 back to the secondary 104. Completion of this circuit causes energization of relay coil 105 to move the switch arms 106 and 107 into engagement with their respective contacts 108 and 109.

Movement of switch arm 107 into engagement with the contact 109 completes a circuit from the line wire 31 through wire 116, contact 109, switch arm 107, wires 117 and 118, variable resistance 119, wire 120, ammeter 121, wire 122, heater 99 and wires 123 and 124 back to the other line wire 30. Movement of switch arm 107 into engagement with the contact 109 also completes a circuit from the line wire 31 through wire 116, contact 109, switch arm 107, wires 117 and 125, field 65 and wires 126 and 124 back to the other line wire 30. Completion of these two circuits causes simultaneous energization of the heater 99 and the field 65. This causes heating of block 90 and rotation of shaft 53 in a counterclockwise direction to move the contact arm 61 into engagement with the contact arm 51.

Movement of switch arm 106 into engagement with the contact 108 completes a maintaining circuit from the secondary 104, through wire 110, contacts 96 and 94, bimetallic element 91, wire 115, contact 108, switch arm 106, wires 114 and 112, relay coil 105 and wire 113 back to the secondary 104. Completion of this circuit maintains the relay coil 105 energized to maintain the switch arms 106 and 107 in engagement with their contacts 108 and 109 until the temperature of block 90 has risen sufficiently to break contact between the contacts 94 and 96. When the temperature of block 90 has risen to the value which is sufficient to break contacts 94 and 96, the relay coil 105 is deenergized to move the switch arms 106 and 107 out of engagement with the contacts 108 and 109. This causes deenergization of the heater 99 and the field 65. The block 90 is then allowed to cool and further rotation of shaft 53 is prevented.

When the temperature of the block 90 is cooled by the outdoor atmospheric conditions so as to cause energization of the relay coil 105, heat is supplied to the block 90 and the shaft 53 is rotated in a counter-clockwise direction. Such a counter-clockwise rotation of the shaft 53 causes engagement of the contact arm 61 with the contact arm 51 to cause energization of the stoker 25 with the consequent generation of steam in the boiler 17. Heat will be supplied to the block 90 and the shaft 53 and contact arms 61 and 51 will continue to be rotated in a counter-clockwise direction until the bimetallic element 91 is satisfied. On relatively cold days the length of time required to bring the block 90 up to temperature so as to deenergize the relay coil 105 will be longer than on relatively warm days. Since the field 65 associated with the rotor 64 is energized simultaneously with the heater 99, the contact arms 57 and 59 will be positioned farther along in a counter-clockwise direction on a cold day than on a warm day. This extended movement of the contact arm 61 beyond its point of engagement with the contact arm 51 is permitted by the strain release connection between the collar 41 and the normally stationary shaft 42.

When the boiler 17 is thus energized to generate steam and deliver the same to the heat exchangers or radiators 12, heat is supplied to the building by reason of the steam condensing in the radiators 12. Condensate flows from the radiators 12 through the condensate meter 22 in the manner pointed out above, and rotates the shaft 42 in a counter-clockwise direction. When the shaft 42 has rotated sufficiently far by the condensation of steam so as to take up the lost motion in the strain release connection, and to move the contact arm 51 into engagement with the contact arm 57, the stoker 25 is stopped to prevent the further generation of steam in the boiler 17 and the delivery of such steam to the radiators 12. In other words, when sufficient steam has been condensed in the radiators to supply a sufficient amount of heat to the building so as to move the contact arm 51 into engagement with the contact arm 57, the further supply of heat to the building is stopped. Since more counter-clockwise movement of the contact arms 57 and 61 is afforded during cold weather than during warm weather, it follows that the shaft 42 must also move farther in a counter-clockwise direction on colder days than on warmer days. Therefore more condensate must be delivered to the condensate meter 22 during cold weather than during warm weather, which means that more heat is delivered to the building during cold weather than during warm weather. By use of the condensate meter 22 and the switching mechanism 40 operated thereby, the actual amount of heat delivered to the building is accurately determined and correlated with the amount of heat delivered to the outdoor controller 89. The capacity of the condensate meter, the speed of rotation of the shaft 53 by the motor rotor 64, and the amount of heat delivered to the outdoor controller 89 under the control of the rheostat or variable resistance 119, are so selected and designed that the amount of heat actually delivered to the outdoor controller is proportioned to the amount of heat actually delivered to the building as the heat losses of the outdoor controller are to the heat losses of the building.

From the above it is seen that I have provided a means for determining or measuring the amount of heat required to be delivered to a building, a means for determining or measuring the amount of heat actually delivered to the building, and means in the form of a switching mechanism for correlating the action of these two means for controlling a firing means such as a stoker for a boiler. In this manner the amount of heat actually delivered to the outdoor controller 89 and to the building is definitely ascertained and proportioned, whereby a substantially constant temperature is maintained within the building in accordance with outdoor atmospheric conditions, including temperature, wind and solar radiation regardless of the condition of the fire bed and draft in the boiler at the time the call for heat is established.

Although I have disclosed one specific embodiment of my invention, various modifications thereof may become apparent to those skilled in the art and therefore this invention is to be limited only by the scope of the appended claims and the prior art.

I claim as my invention:

1. In a system of the class described, means for delivering a conditioning medium to a space to be conditioned, means responsive to the conditioning load of the space for placing the delivering means in operation, and means responsive to the amount of conditioning medium delivered to the space for placing the delivery means out of operation.

2. In a system of the class described, heat exchanger means in a space the temperature of which is to be controlled, means for delivering fluid to the heat exchanger means, means responsive to a condition indicative of the temperature changing load for starting operation of the delivering means, and means responsive to the amount of fluid delivered to the heat exchanger means for stopping operation of the delivering means.

3. In a steam heating system for a building, heat exchanger means, a boiler for supplying steam to the heat exchanger means, firing means for the boiler, and means for controlling said firing means including means responsive to outdoor atmospheric conditions including temperature, wind and solar radiation and means responsive to the amount of steam delivered to the heat exchanger means.

4. In a steam heating system for a space having heat exchanger means, a boiler and a stoker therefor, means for measuring the heating load of the space, a condensate meter, and switching mechanism operated by said condensate meter and said measuring means for controlling said stoker.

5. In a steam heating system for a building having heat exchanger means, a boiler and a stoker therefor, an outdoor controller for measuring the heating load of the building, a condensate meter, and switching mechanism operated by said condensate meter and said outdoor controller for controlling said stoker.

6. In a steam heating system for a building, heat exchanger means, a boiler and a firing means, an outdoor controller subject to the same atmospheric conditions as the building, heating means for the outdoor controller whereby the outdoor controller is affected by temperature, wind and solar radiation, means responsive to the temperature of the outdoor controller, a condensate meter responsive to the amount of steam condensed in said heat exchanger means, and switching mechanism operated by said condensate meter and said thermostatic means for controlling said firing means.

7. In a steam heating system for a building, heat exchanger means, a boiler and a firing means, an outdoor controller subject to the same atmospheric conditions as the building, heating means for the outdoor controller whereby the outdoor controller is affected by temperature, wind and solar radiation, means responsive to the temperature of the outdoor controller, a condensate meter responsive to the amount of steam condensed in said heat exchanger means, an electric motor, the controller heating means and the electric motor being energized when said thermostatic means calls for heat, a switching mechanism operated by said electric motor and said condensate meter for controlling said firing means.

8. In a heating system for a building, means for supplying heat to the building, means for measuring the amount of heat supplied to the building, a device located outside of said building and having heating means to cause said device to be affected by outdoor atmospheric conditions including temperature, wind and solar radiation whereby said device measures the heat loss from said building, and control means operated by said device for supplying heat to the building, said control means also operated by said measuring means for stopping the supply of heat to the building.

9. In a heating system for a building, means for supplying heat to the building, a device located outside of the building and subject to the same atmospheric conditions as the building, said device including heating means and thermostatic means, means controlled by the thermostatic means for energizing and deenergizing the heating means of the device to maintain the temperature of the device within desired limits, control means operated by the thermostatic means simultaneously with the energization of the heating means of the device for measuring the heat loss from the building, control means for measuring the amount of heat supplied to the building, and means controlled by the conjoint action of both control means for controlling the building heat supplying means.

10. In a heating system for a building, means for supplying heat to the building, a device located outside of the building and subject to the same atmospheric conditions as the building, said device including heating means and thermostatic means, means controlled by the thermostatic means for energizing and deenergizing the heating means of the device to maintain the temperature of the device within desired limits, control means operated by the thermostatic means simultaneously with the energization of the heating means of the device for measuring the heat loss from the building, control means for measuring the amount of heat supplied to the building, means controlled by the first control means for supplying heat to the building upon a call for heat and controlled by the second control means for interrupting the supply of heat to the building when the correct amount of heat has been supplied to the building to make up for the heat loss therefrom.

DANIEL G. TAYLOR.